Oct. 29, 1963 W. KROLL 3,109,069
SYNCHRONIZATION MEANS FOR DECOMMUTATING
A NON-RETURN-TO-ZERO PAM SIGNAL
Filed Aug. 29, 1960 6 Sheets-Sheet 1

INVENTOR.
WILLIAM KROLL
BY
George A. Sullivan
Agent

INVENTOR.
WILLIAM KROLL
BY
[signature]
Agent

INVENTOR.
WILLIAM KROLL
BY
George C. Sullivan
Agent

INVENTOR.
WILLIAM KROLL
BY
George C. Sullivan
Agent

INVENTOR.
WILLIAM KROLL
BY
George C. Sullivan
Agent

INVENTOR.
WILLIAM KROLL
BY
George C. Sullivan
Agent

3,109,069
SYNCHRONIZATION MEANS FOR DECOMMUTATING A NON-RETURN-TO-ZERO PAM SIGNAL

William Kroll, Sunnyvale, Calif., assignor to Lockheed Aircraft Corporation, Burbank, Calif.

Filed Aug. 29, 1960, Ser. No. 52,591
3 Claims. (Cl. 179—15)

This invention relates generally to means for decommutating a time multiplexed signal and more particularly to improved synchronization means for decommutating a non-return-to-zero PAM signal, such as is used in telemetering applications.

A widely used telemetering system for testing guided missiles and space vehicles, commonly referred to as FM/FM, involves a system in which the intelligence to be transmitted frequency modulates a number of subcarrier oscillators, and the composite group of subcarriers signals then in turn frequency modulates an RF transmitter. At the ground receiving station, the several frequency-modulated subcarrier signals are separated by means of bandpass filters, and the separated signals pass through subcarrier discriminators and suitable demodulators in order to recover the original intelligence.

Because of the need of increasing the intelligence handling capacity of such FM/FM telemetering systems, it has become necessary to employ electronic or mechanical commutators in one or more of the subcarrier channels. Such a commutator permits a number of channels of intelligence to be applied to the same subcarrier oscillator on a time sharing basis so as to effectively increase the intelligence handling capacity of the system. The output signal from the commutator which is fed to a particular subcarrier oscillator then consists of a repeating sequence of pulses, which is commonly referred to as a PAM signal.

With the introduction of a commutator in the transmitting system for multiplexing purposes in order to increase the intelligence handling capacity, it then becomes necessary to provide suitable decommutation means in the receiver which will be capable of accurately and reliably separating out the multiplexd PAM signal after detection of the subcarrier modulation in a conventional manner. The main problem that has arisen in connection with such decommutation involves the provision of suitable synchrnoizing means under practical operating conditions. For example, while there are many suitable synchronization means which would be quite adequate for ideal conditions, most of these may become quite unreliable under actual operating conditions where the speed of rotation of the commutator in the transmitter may vary over a period of time by as much as ±30%. As a result, it has become necessary to put certain restrictions on the type of PAM signal which can be employed. Two such restrictions are first that each intelligence channel have a signal of a certain minimum value at all times, and second that a discrete zero "off" time be provided between intelligence channels (which is usually made equal to the "on" time of the commutator). The resultant signal obtained is commonly referred to as a return-to-zero PAM signal and, because of the requirement of discrete zero "off" times, the potential information handling capacity made possible by the use of multiplexing is considerably reduced.

With the ever increasing demands being made on the information handling capacity of telemetering systems, attemps are being made to free the PAM signal of the two above-mentioned restrictions so that the full benefit of multiplexing can be achieved. In particular, a non-return-to-zero PAM signal is now being used in which there is no requirement of minimum levels for each intelligence channel and the "off" time between channels is negligible. The main difficulty with the use of such a non-return-to-zero PAM signal is the difficulty of obtaining accurate and reliable synchronization, since in such a signal discrete pulses may not be continuously obtained for each channel, and there may be a significant period during which the non-return-to-zero PAM signal may appear constant for a period of several channels. It will be appreciated, therefore, that accurate and reliable synchronization of a non-return-to-zero PAM signal is necessarily a most difficult problem which has still not been satisfactorily overcome in presently known decommutation systems.

Accordingly, it is an object of the present invention to provide accurate and reliable synchronization means for use in decommutating a non-return-to-zero PAM signal.

Another object of this invention is to provide improved means for controlling the phase and frequency of the output pulses of a multivibrator in accordance with a multiplexed reference signal.

A further object of this invention is to provide improved synchonization means in the decommutation portion of a multiplexed telemetering system.

The above objects are accomplished in accordance with a typical embodiment of the present invention by employing phase and frequency controlled loops operating in cooperation with a multivibrator to lock the multivibrator output pulses into exact synchronization with the channels of a non-return-to-zero PAM signal produced by commutator action in the transmitter of a telemetering system. These multivibrator pulses may then be used to generate the necessary pulses for accurately and reliably decommutating the non-return-to-zero PAM signal, even in the presence of significant variations in the speed of commutation in the transmitter.

The specific nature of the invention as well as other objects, uses and advantages thereof, will clearly appear from the following description and from the accompanying drawing in which.

Like numerals designate like elements throughout the figures of the drawing.

Figure 1:
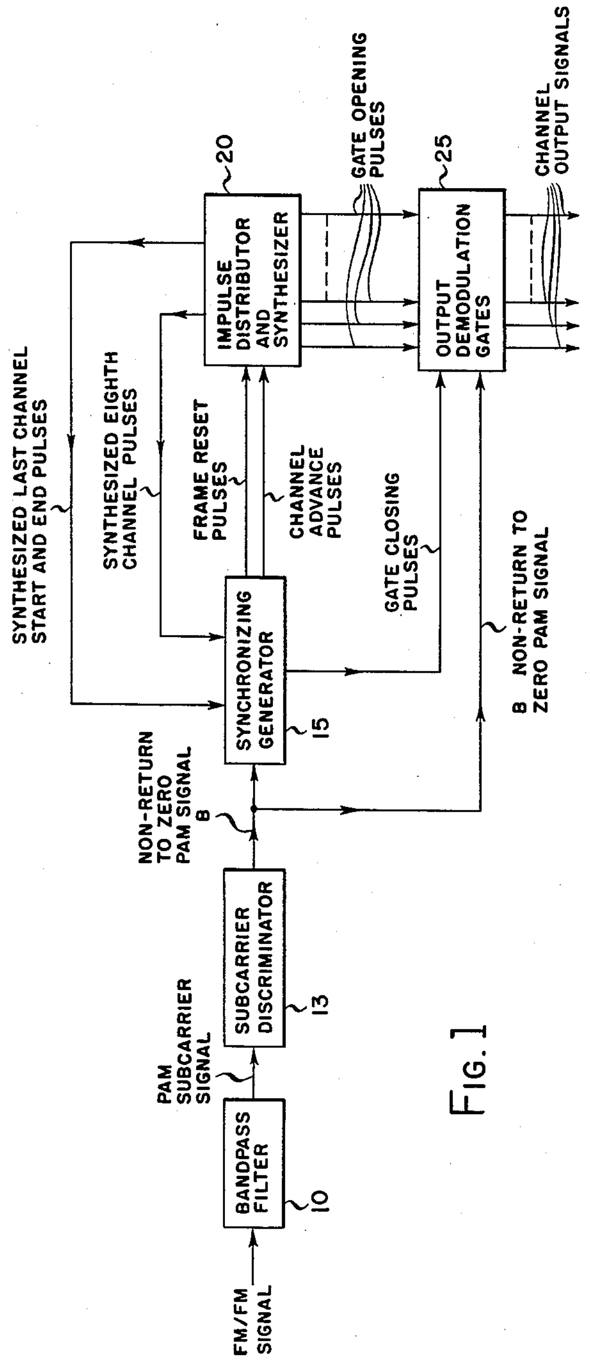
FIG. 1 is a block diagram of a portion of an FM/FM receiving system for decommutating a non-return-to-zero PAM signal in accordance with the invention.
Figure 3:
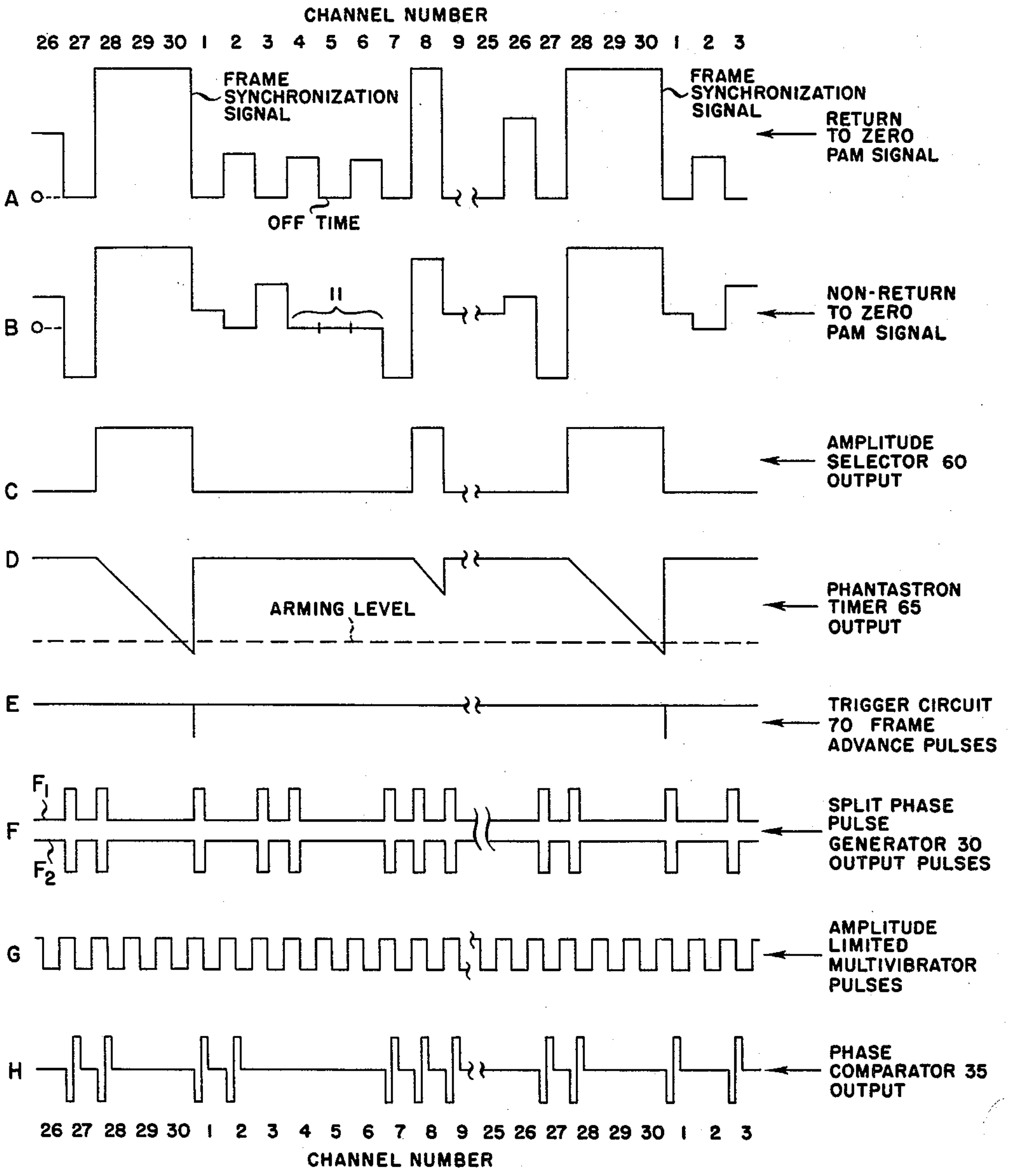
FIG. 3 is a graph illustrating the waveforms of signals at various points in the block diagrams of FIGS. 1 and 2.

In FIG. 1, which is a block diagram of a subcarrier portion of an FM/FM PAM telemetering receiving system, the received FM/FM signal is fed to a bandpass filter 10 which extracts a particular PAM subcarrier signal in a conventional manner. The extracted subcarrier signal is then fed to any well known type of subcarrier discriminator 13 to obtain the non-return-to-zero PAM signal which must now be decommutated in order to recover the intelligence in each channel. Waveform B of FIG. 3 illustrates a typical non-return-to-zero PAM signal of 30 channels to a frame which might appear at the output from the subcarrier discriminator 13. The last three channels 28, 29 and 30 carry the frame synchronization signal.

For purposes of comparison the more usual return-to-zero PAM signal is shown in graph A of FIG. 3. Since alternate channels of the usual return-to-zero PAM signal are returned-to-zero as shown in graph A (except for the frame synchronization signal), and each alternate intelligence channel is required to have a certain minimum level, a discrete pulse is obtained for each intelligence channel in the frame and the derivation of synchronizing pulses therefrom is a relatively simple matter.

In the non-return-to-zero PAM signal shown in graph B, however, the "off" time between channels is made negligible so that each channel contains intelligence, and there is no requirement that the channels have a minimum level. It is quite possible, therefore, that a number of channels might go by without any significant pulses appearing in the non-return-to-zero PAM signal, as illustrated, for example, at 11 in graph B. Deriving synchronizing pulses from such a non-return-to-zero signal is consequently a very much more difficult problem, particularly where the speed of commutator action in the transmitter may vary by as much as ±30%. The means by which reliable and accurate synchronizing signals are derived from this non-return-to-zero signal is the chief feature of the present invention.

Before considering the synchronizing means of this invention in detail, the overall system will first be outlined for background purposes. As shown in FIG. 1, the non-return-to-zero PAM signal B obtained at the output of the subcarrier discriminator 13 is fed to a plurality of output demodulation gates 25 which may be the same as used with the usual return-to-zero PAM signal. In order to decommutate the PAM signal, it is obvious that these gates 25 must be activated in proper synchronism with corresponding channels of the PAM signal. The necessary synchronizing signals are derived by feeding the non-return-to-zero PAM signal from the subcarrier discriminator 13 to a synchronizing generator 15 which generates frame reset and channel advance pulses in synchronized relationship with the PAM signal. Once such pulses are available, they may be fed to a conventional form of impulse distributor and synthesizer 20 which feeds the required gate opening pulses to the output demodulation gates 25. Since only one of the output demodulation gates is open at any one time, gate closing pulses may conveniently be derived from the synchronizing generator 15 and fed to all the output demodulation gates 25 simultaneously.

The impulse distributor and synthesizer 20 may be provided in a variety of well known ways employing present skill in the art and may employ a suitable arrangement of one or more ring counters in conjunction with a suitable diode matrix for distributing gate opening pulses to the output demodulation gates 25. Synthesized last channel start and end pulses and a synthesized eighth channel pulse are fed to the synchonizing generator 15 from the impulse distributor and synthesizer 20 for frequency comparison purposes as will hereinafter become apparent.

Figure 2:
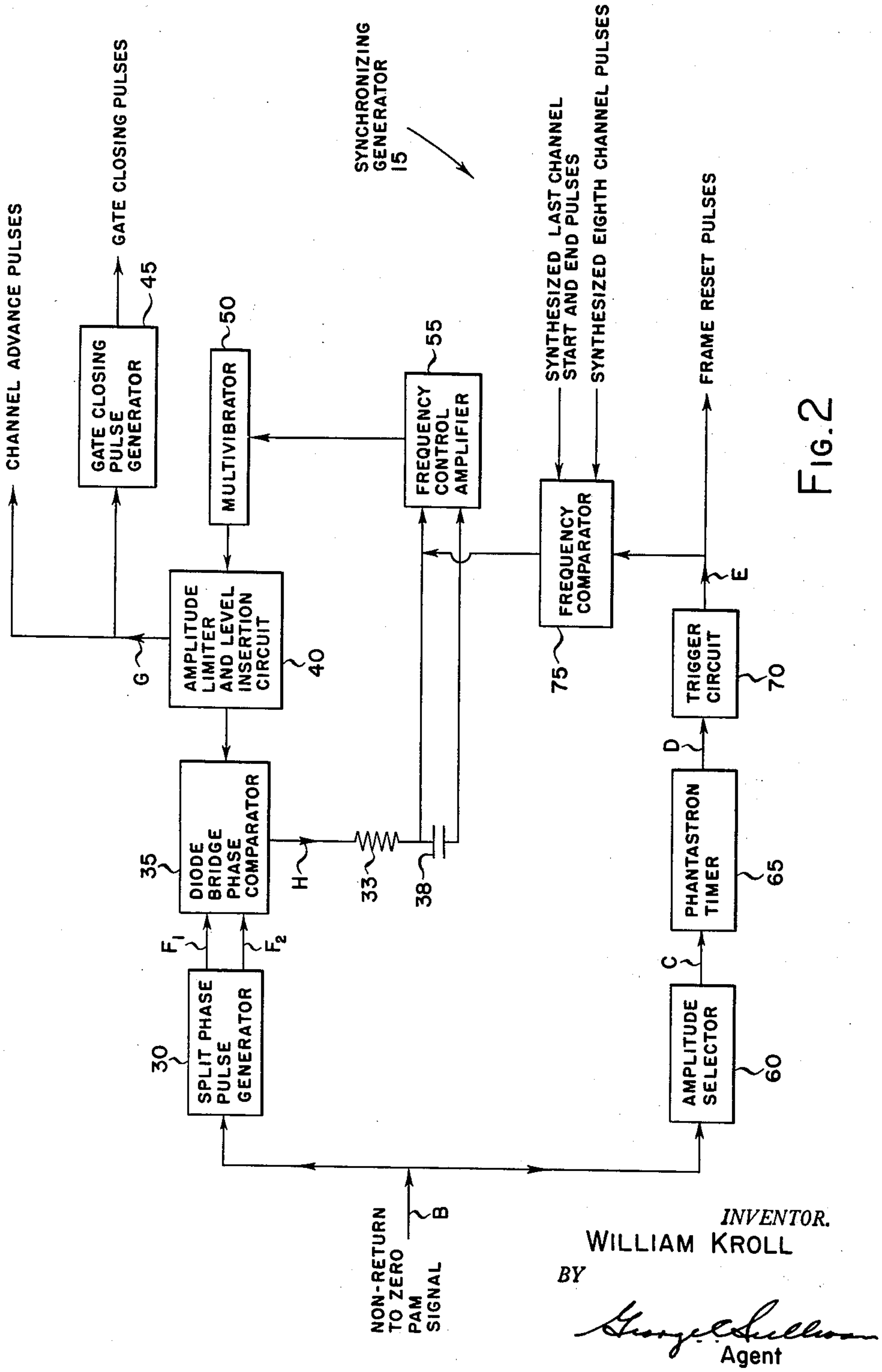
FIG. 2 is a block diagram of the synchronizing generator 15 of FIG. 1.

The synchronizing generator 15 will now be considered in detail referring to FIG. 2 which is a block diagram thereof.

Considering first the generation of frame reset pulses, it will be understood that such pulses may be derived in a relatively simple manner by suitably detecting the frame synchronization signal which is carried in the last three channels 28, 29 and 30 of the PAM signal as shown in graph B of FIG. 3. A preferred way of accomplishing this is illustrated in the lower portion of FIG. 2 in which the non-return-to-zero PAM signal B is fed to a conventional type of amplitude selector 60 which selects all those pulses in the PAM signal above a predetermined amplitude as illustrated in graph C of FIG. 3. Note that the large amplitude pulse appearing during the eighth channel is also passed by the amplitude selector 60 in addition to the large amplitude frame synchronizing signal of channels 28, 29 and 30. The output C of the amplitude selector 60 is now fed to a phantastron timer 65 which may be of conventional design, such as a suppressor grid-control phantastron. As illustrated in graph D of FIG. 3, the phantastron timer 65 provides a negatively increasing output which increases linearly for the duration of the pulse applied thereto from the amplitude selector 60.

The frame synchronizing pulse in the PAM signal which is present during channels 28, 29 and 30 is chosen so that the output of the phantastron timer 65 decreases to a point where it arms a trigger circuit 70 having an arming level as indicated in graph D. The trigger circuit 70 may have any of a variety of well known forms and once armed, produces a pulse at a time corresponding to the back end of the frame synchronization signal pulse as shown in graph E. These pulses thus generated by the trigger circuit 70 serve as frame reset pulses as indicated. It will be noted that the large amplitude signal of the eighth channel of the PAM signal, which is also selected by the amplitude selector 60, is present for only one channel, and this is too short to permit the phantastron timer 65 to run down to the arming level of the trigger circuit 70 as illustrated in graph D. Thus, the provision of a three channel synchronization signal prevents large channel signals or interfering noise from producing unwanted frame reset pulses. Of course, it is conceivable that three adjacent channels will have intelligence channels of sufficient magnitude to cause triggering, but this is so rare as to not cause any difficulty in actual practice. The frame reset pulses from the trigger circuit 70 are now fed to the impulse distributor and synthesizer 20 as shown in FIG. 1 to recycle the output demodulation gates 25 in a conventional manner.

From the previous discussion it is evident that because of the presence of the three-channel frame synchronization signal in the PAM signal as shown in graph B, the derivation of frame advance pulses is relatively straightforward. However, the derivation of channel advance pulses from a non-return-to-zero PAM signal is another matter, since as explained previously, commutation speed at the transmitter may vary considerably and discrete channel pulses may not be present for each channel. The upper portion of the block diagram of FIG. 2 illustrates how accurate and reliable channel advance pulses may be derived in spite of these obstacles.

The non-return-to-zero PAM signal B is first fed to a split-phase pulse generator 30 which generates split-phase pulses which are in phase but have opposite polarities as illustrated at $F_1$ and $F_2$ in graph F of FIG. 3. These split-phase pulses $F_1$ and $F_2$ are generated at the beginning of each channel when the amplitude transition from one channel to the next is greater than some minimum value (in order to prevent unwanted triggering by noise) and have a pulse width which may conveniently be chosen as one-third of the total time of each channel. It will be noted in graph F of FIG. 3 that because the PAM signal is of the non-return-to-zero type, split-phase pulses are not produced for every channel, but only those where a minimum transition is present. The requirement of a minimum transition is necessary to prevent unwanted noise signals from triggering the system, but as a result, the derivation of channel advance pulses becomes much more difficult since pulses are not produced for each channel. The design of a split-phase pulse generator as indicated at 30 is well within the skill of those in the art.

The output pulses $F_1$ and $F_2$ from the split-phase pulse generator 30 are fed to the gating inputs of a diode bridge phase comparator 35 for phase comparison with the pulses generated by a multivibrator 50 whose output is coupled to the diode bridge phase comparator 35 through an amplitude limiter and level insertion circuit 40. The term "multivibrator" is meant in its broadest sense and is to be considered herein and in the appended claims as including a wide variety of pulse oscillators having controllable oscillation frequencies. In accordance with the invention, it is the amplitude limited pulses from the multivibrator 50 illustrated in graph G of FIG. 3 which serve as the channel advance pulses to be fed to the impulse distributor and synthesizer 20 from which the gate opening pulses for the output demodulation gates 25 are generated. The gate closing pulses are also generated from the multivibrator pulses by means of a gate closing pulse generator 45 connected to the amplitude limiter and level insertion circuit, 40.

As shown in graph G the oscillation of the multivibrator 50 is chosen such that one complete cycle of oscillation (that is, one positive and one negative pulse) is provided for each channel. Since it is the amplitude limited multivibrator output pulses from which the gate closing pulses and the channel advance pulses are generated, the multivibrator 50 must necessarily be locked in precise phase and frequency relationship with respect to the channels and frames of the non-return-to-zero PAM signal, regardless of speed variations in the commutator at the transmitter or the absence of discrete channel pulses. This is accomplished by combined phase and frequency control of the multivibrator pulses.

Figure 4:
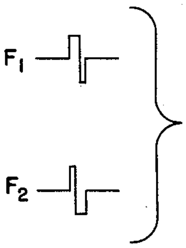
FIG. 4 is a graph illustrating possible output waveforms from the phase comparator 35 of FIG. 2.

Phase control is provided by feeding the amplitude limited and level controlled multivibrator pulses from the circuit 40 to the diode bridge phase comparator 35 to which the split-phase pulses $F_1$ and $F_2$ are also fed. The diode bridge phase comparator 35 may be a suitably designed six-diode bridge which passes multivibrator pulses only when the split-phase pulses $F_1$ and $F_2$ are present. At the output of the diode bridge phase comparator 35, therefore, pulses as illustrated at H in the graph of FIG. 3 are obtained which are representative of the phase relationship between the multivibrator pulses G and the split-phase pulses $F_1$ and $F_2$. When the multivibrator pulses G are exactly in the proper phase relationship with the split-phase pulses $F_1$ and $F_2$, equal positive and negative pulses will be obtained for each split-phase pulse duration as illustrated in graph F of FIG. 3. However, if the multivibrator output pulses are not in the proper phase with respect to the split-phase pulses $F_1$ and $F_2$, either the positive or negative portions of the phase comparator output pulses will be present for a longer duration as illustrated by graphs $F_1$ and $F_2$ in FIG. 4. Thus, a capacitor 38 connected to the phase comparator 35 through a resistor 33 will tend to charge in either a positive or negative direction depending upon the phase relationship of the multivibrator pulses with respect to the split-phase pulses $F_1$ and $F_2$.

The capacitor 38 is now coupled to a frequency control amplifier 55 whose output feeds the multivibrator 50 in such a way that the multivibrator pulses are urged into phase synchronization with the split-phase pulses $F_1$ and $F_2$ as a result of the action of the phase comparator 35. If split-phase pulses were obtainable for each PAM channel and the speed of commutation did not vary too greatly, such a phase control loop as just described would ordinarily be quite satisfactory in insuring the proper relationship of the multivibrator pulses so that decommutation of the PAM signal could be reliably and accurately obtained. But, where the PAM signal is of the non-return-to-zero type where discrete channel pulses may not always be present and possible variations in the speed of commutator action in the transmitter are expected, the use of only the phase comparator loop just described is most unsatisfactory and entirely inadequate for practical purposes. In particular, the multivibrator 50 may lock in at some multiple, sub-multiple or fractional frequency of the PAM channel frequency, which is clearly unacceptable for proper decommutation.

In the search for a solution to this problem, I have discovered that by employing frequency comparison in combination with the phase comparison described above, it is possible to lock the multivibrator pulses in the proper relationship with respect to the split-phase pulses $F_1$ and $F_2$, even though discrete channel pulses are not present and considerable variation in commutation action is possible. This is accomplished in a most expeditious manner by means of a frequency control loop which makes use of the frame reset pulses obtained from the trigger circuit 70 along with the synthesized last channel start and end pulses and eighth channel pulses generated in the impulse distributor and synthesizer 20. It will be recognized that the synthesized last channel start and end pulses correspond to the start and end of the particular multivibrator cycle which is to be the last cycle in the frame. That is, if the PAM signal has 30 channels, the synthesized last channel start and end pulses will correspond to the 30th multivibrator cycle in a frame and can conveniently be obtained from the 30th channel circuit of the impulse distributor and synthesizer 20.

The frame reset pulses, the synchronized last channel start and end pulses, and the synchronized eight channel pulses are fed to a frequency comparator 75 which produces an output signal whenever the number of cycles of the multivibrator in a given frame differs from the desired number of channel pulses per frame of the PAM signal. This frequency comparator output signal occurs for a significant number of channels (eight for example) and when fed to the frequency control amplifier 55 as shown overrides the signal from the diode bridge phase comparator 35 to correct the frequency of the multivibrator 50 so that it produces the same number of cycles per frame as the channels per frame of the PAM signal. This type of control of the multivibrator pulses is a form of frequency control and, along with the phase control provided by the phase control loop including the diode bridge phase comparator 35, has been found to reliably and accurately lock the multivibrator pulses precisely in phase and frequency with the channel pulses of the non-return-to-zero PAM signal, even though channel pulses may be missing and the commutator speed in the transmitter will vary within limits of as much as ±30%. In this connection it will be noted that when the non-return-to-zero PAM signal fails to show discrete pulses, the voltage to which the capacitor 38 has charged can be held relatively constant, since the discharge paths thereacross may conveniently be made of high impedance. Thus, the capacitor 38 will keep the multivibrator 50 running at precisely the same frequency and phase for a period of several seconds. The action of the capacitor 38 in this manner is analogous to an electronic flywheel and discrete channel pulses will ordinarily appear before any significant change in commutation speed at the transmitter takes place.

Figure 5:
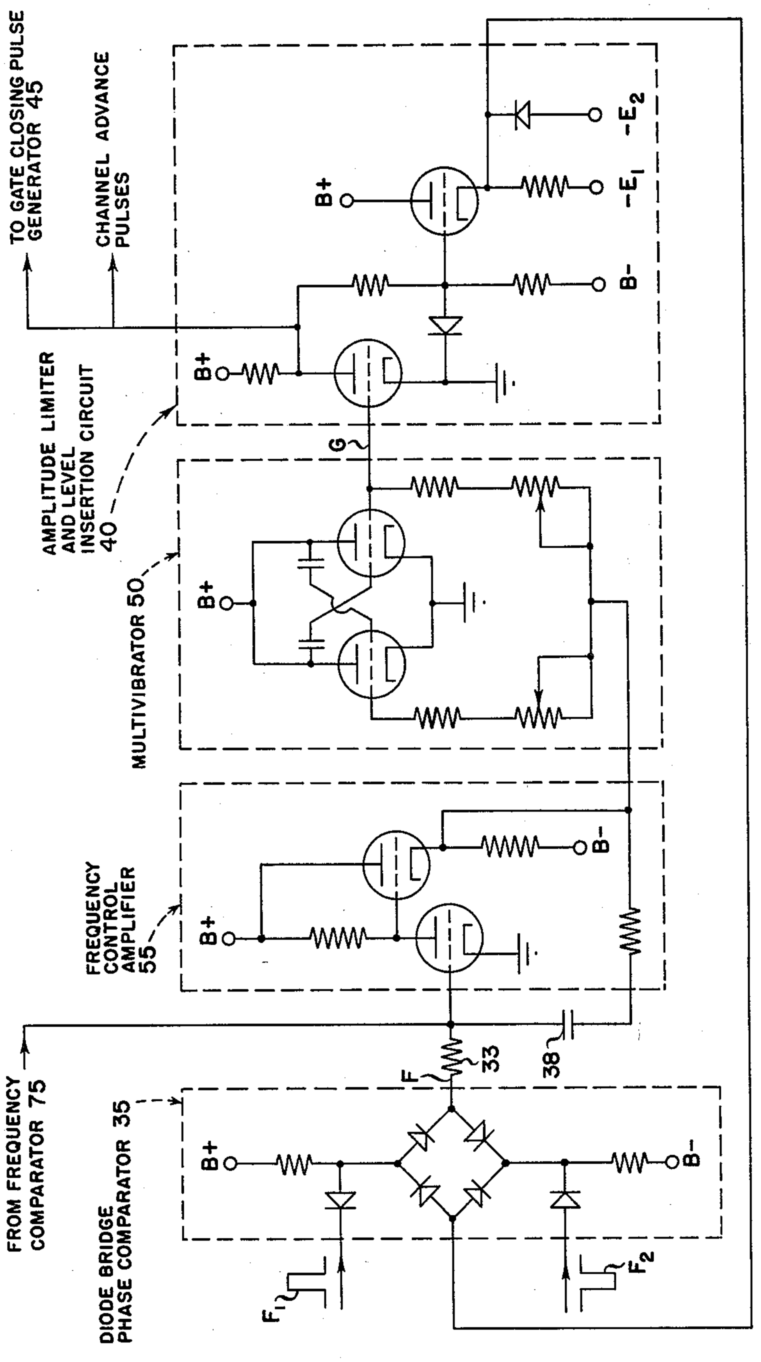
FIG. 5 is an electrical circuit diagram of a specific embodiment of the phase control loop portion of the synchronizing generator 15 of FIG. 2.

FIG. 5 is an electrical circuit diagram illustrating a specific form of the phase control loop described in connection with FIG. 2 comprising the multivibrator 50, the amplitude limiter and level insertion circuit 40, the diode bridge phase comparator 35 and the frequency control amplifier 55. Since the particular circuitry for each element shown in FIG. 5 is generally well known and within the skill of those in the art, no detailed description of the design or operation thereof will be presented. Reviewing the overall operation of the phase comparison loop, however, it will be remembered that the split-phase pulse generator output pulses $F_1$ and $F_2$ are applied to the diode bridge phase comparator 35 along with the output pulses from the multivibrator 50 which are first amplitude limited and a suitable level inserted by the amplitude limiter and level insertion circuit 40. The resultant output of the diode bridge phase comparator 35 is shown at H in FIG. 3 for the properly synchronized case and at $F_1$ and $F_2$ in FIG. 4 for out-of-synchronization cases. When the phase comparator output is composed of equal positive and negative portions as shown at H in FIG. 3 the voltage across the capacitor 38 remains constant, so that the output from the frequency control amplifier 55, which is connected to control the frequency of the multivibrator 50, also remains constant, and the phase and frequency of the multivibrator pulses will thereby remain unchanged. However, as shown at $F_1$ and $F_2$ in FIG. 4, if the multivibrator pulses tend to get out of the proper phase relationship, the voltage on the capacitor 38 will change in a direction which causes the frequency control amplifier 55 to shift the frequency of the multivibrator pulses in a direction which corrects their phase relationship with respect to the split-phase pulses $F_1$ and $F_2$.

While there are a number of possible ways of providing frequency comparison as described in connection with FIG. 2, I prefer to use the highly advantageous embodiment of the frequency comparator 75 illustrated by the block diagram of FIG. 6. FIG. 7 is a waveform diagram illustrating waveforms appearing at various points of the frequency comparator 75 of FIG. 6.

Referring to FIG. 7, graphs G′ and G″ represent respectively synthesized start and end last channel pulses (the last channel being 30 in FIG. 3) generated in the impulse distributor and synthesizer 20 from the multivibrator pulses fed thereto, and may now be conveniently fed to the frequency comparator 75 for frequency comparison purposes. Considering first, the top half of FIG. 7, the synthesized last channel pulses G′ from the impulse distributor and synthesizer 20 and the frame pulses E from the trigger circuit 70 are fed to the inputs *a* and *b*, respectively, of a flip-flop 170, whose output is delayed by a delay 172 and then fed to control an "AND" gate 174. Graph E in FIG. 7 represents the frame reset pulses obtained from the output of the trigger circuit 70 and is the same as graph E in FIG. 3. The delayed output from the flip-flop 170 appearing at the output of the delay 172 is shown by graph I. The synthesized last channel pulses act to turn the "AND" gate "on" while the frame reset pulses E act to turn the "AND" gate "off," producing the delaying pulses shown in graph I.

Figure 6:
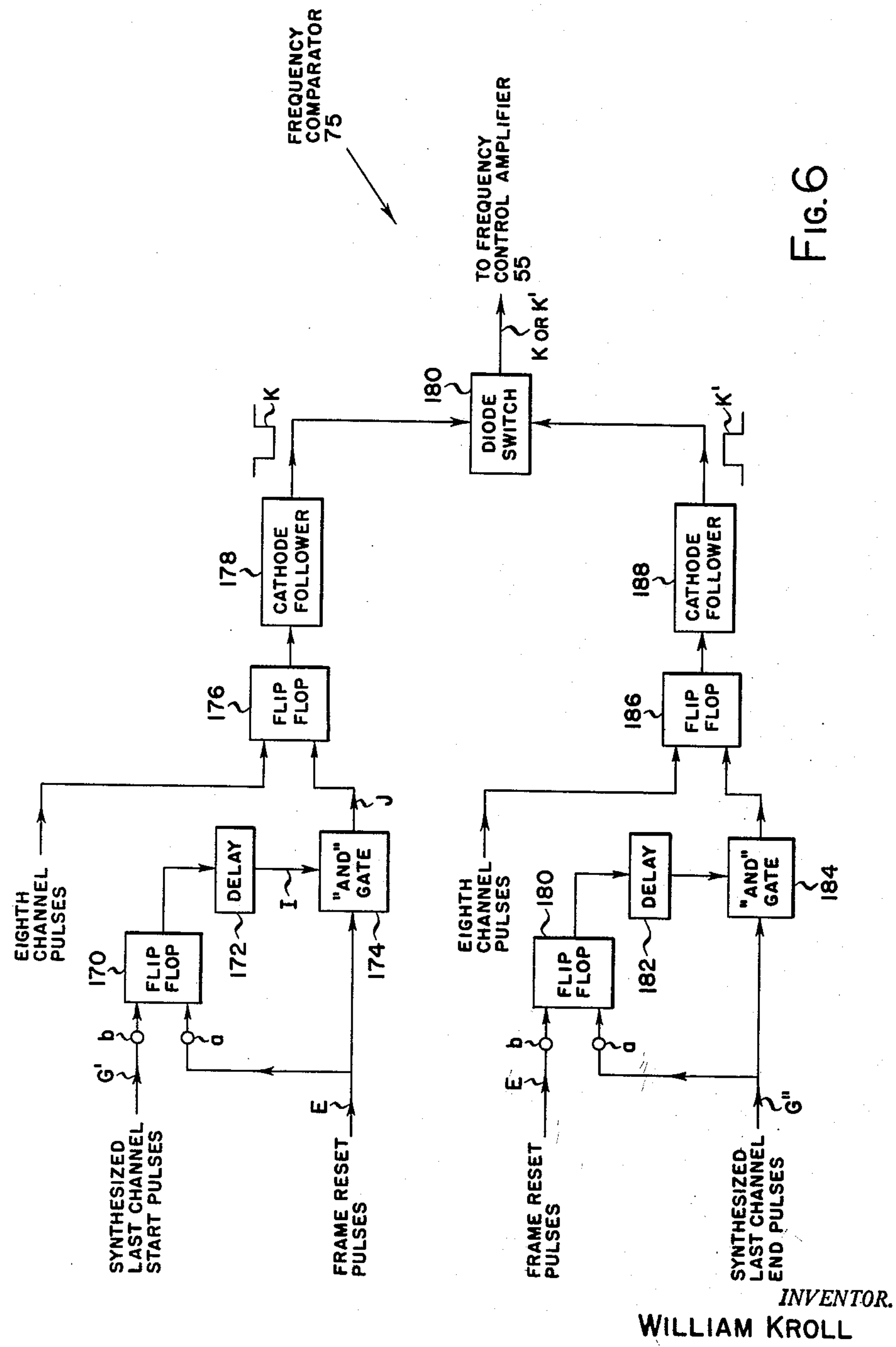
FIG. 6 is a block diagram of a preferred embodiment of the frequency comparator 75 of FIG. 2.
Figure 7:
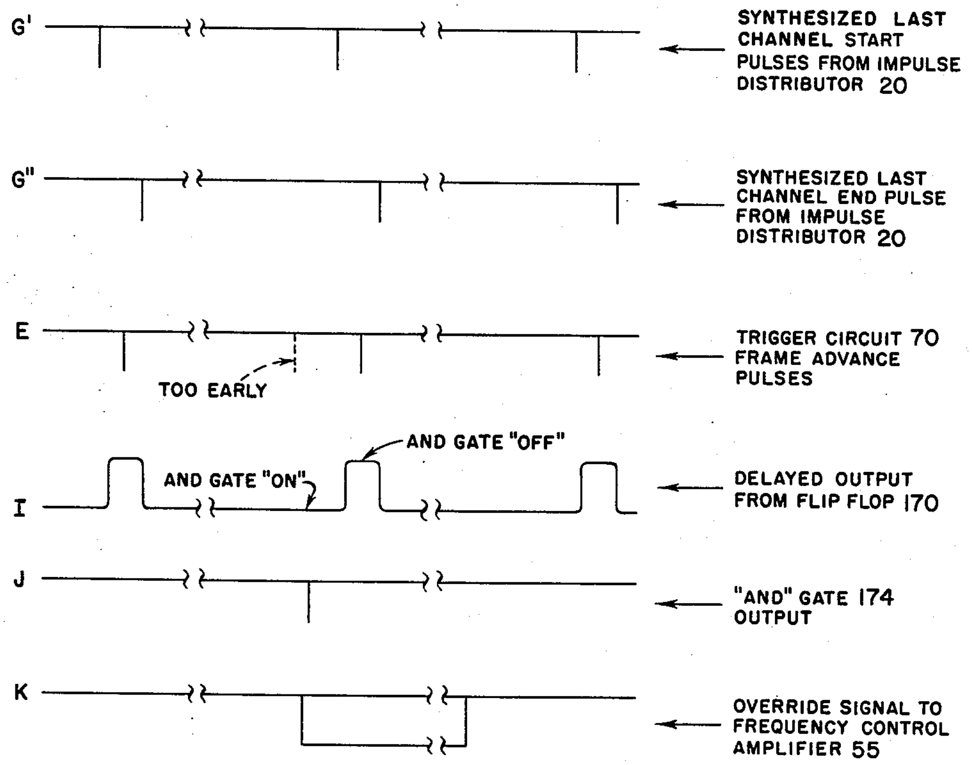
FIG. 7 is a waveform diagram illustrating the operation of the frequency comparator of FIG. 6.

The frame reset pulses E in the top half of FIG. 6 are also fed to the input of the "AND" gate 174. Thus, if a frame reset pulse occurs during the "off" time of the "AND" gate 174 as shown by the solid pulses in graph I, no output will be obtained from the "AND" gate. However, if a frame reset pulse occurs before the synthesized last channel start pulse as indicated by the dashed pulse in graph E of FIG. 7, the "AND" gate 174 will be "on" permitting the frame reset pulse to pass to the output of the "AND" gate 174 as shown by graph J. Since each frame advance pulse resets the impulse distributor and synthesizer 20, if the frame reset pulse occurs before the synthesized last channel pulse, the synthesized last channel pulses will not be generated by the synthesizer 20 and will remain absent until the desired condition is reached where the synthesized last channel start pulse occurs before the frame reset pulse.

In order to produce this desired condition, the output of the "AND" gate 174 is fed to a flip-flop 176 along with the synthesized eighth channel pulse from the impulse distributor and synthesizer 20, so that at the output of the flip-flop 176, there is obtained a pulse extending for eight channels as shown by graph K of FIG. 7. This eight channel pulse K is fed to the frequency control amplifier 55 through a conventional type of diode switch 180 to override the phase comparator pulses and increase the multivibrator frequency until the last channel start pulses occur before the frame reset pulses, at which time the "AND" gate will be "off" during the occurrence of the frame reset pulses E, so that no further frequency comparator pulses K are produced. It will be realized, therefore, that the top portion of FIG. 6 acts to control the multivibrator frequency so that the synthesized last channel start pulses occur before the frame advance pulses. Thus, if there are 30 channels to a frame as illustrated in FIG. 3, the upper portion of FIG. 6 causes the multivibrator 50 to generate pulses corresponding to at least 30 full cycles before the impulse distributor and synthesizer 20 is reset by the frame reset pulses.

The lower portion of FIG. 6 is the same as that of the upper portion, and the elements 180, 182, 184, 186 and 188 in the lower portion may be made identical to like elements 170, 172, 174, 176 and 178, respectively, in the upper portion. The difference between the upper and the lower portions is in the signals fed thereto. In the lower portion the frame advance pulses E are substituted for the synthesized last channel start pulses G′ in the upper portion, and the synthesized last channel end pulses G″ in the lower portion are substituted for the frame advance pulses E in the upper portion, as shown.

The operation of the lower portion of FIG. 7 is similar to that of the upper portion, except that a positive pulse K′ is fed to the frequency control amplifier 55 instead of the negative pulse K produced by the upper portion. By analogy with the operation of the upper portion described above, it will be apparent that the lower portion of FIG. 6 operates to control the multivibrator frequency so that the frame reset pulses occur before the synthesized last channel end pulse—that is, before the end of the 30th multivibrator cycle. It will now be realized that the upper and lower portions of FIG. 6 acting together will control the multivibrator frequency so that the frame advance pulses E occur between the start and end of the synthesized last channel. Thus, the multivibrator 30 will be caused to generate a predetermined number of complete cycles per frame (30 in FIG. 3) which is exactly equal to the number of channels per frame in the PAM signal. The only requirement of the delays 172 and 182 in FIG. 6 is that they must provide a delay which is at least as long as the frame reset pulses and the start and end last channel pulses.

It may be noted that if no PAM signal is present, the synthesized last channel end pulse G″ will continue to pass through the "AND" gate 184 in the lower portion of FIG. 6, since it is the synthesized last channel end pulse G″ which turns the "AND" gate 184 "on" and there will be no frame reset pulses E to turn the "AND" gate 184 "off." This is no problem in the upper portion, since there it is the frame reset pulses E which turn the "AND" gate 184 "on."

In the absence or temporary loss of a PAM signal, therefore, pulses K′ from the lower portion of FIG. 6 will continuously be produced and will act to reduce the frequency of the multivibrator 50 from its proper oscillation frequency, which may be undesirable in certain cases. In any event, the return of the multivibrator 50 to its correct frequency when the PAM signal returns will be delayed. Also, if one frame intelligence signal in the PAM signal were lost, a pulse K′ would be produced even if the multivibrator frequency is correct, which is likewise undesirable.

Figure 8:
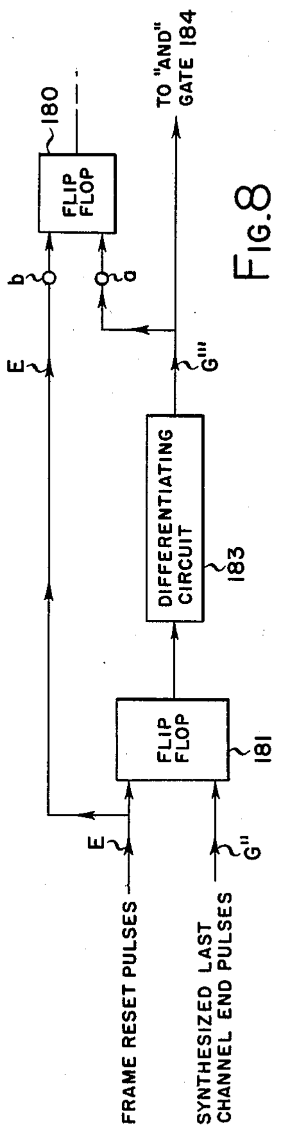
FIG. 8 is a block diagram illustrating a modification of the lower portion of FIG. 6.

To prevent the lower portion of FIG. 6 from producing pulses K′ in the absence of frame intelligence pulses, the synthesized last channel end pulses G″ may first be fed to a flip-flop 181 as shown in FIG. 8 along with the frame reset pulses E. The output of the flip-flop 181 is then fed to a differentiating circuit 183 which converts the output of the flip-flop 181 into an output pulse G‴ corresponding to the synthesized channel end pulses. The advantage thus obtained is that when no frame reset pulses appear, the flip-flop 181 remains in the same state so that no pulses G‴ will be produced to pass through the "AND" gate and generate unwanted frequency control pulses K′.

It is to be understood in connection with the present invention that the embodiments described herein are only exemplary and many variations and modifications may be made in the construction thereof without departing from the spirit of the invention. The invention, therefore, is to be considered as including all possible modifications and variations coming within the scope of the invention as defined by the appended claims.

I claim as my invention:

1. The combination of a multivibrator and means for controlling the frequency thereof in accordance with a multiplexed signal having a predetermined number of channels per frame, said means comprising a frequency comparator to which pulses corresponding to the start and end of the multivibrator cycle which is to be the last in the frame are fed along with frame reset pulses derived from said multiplexed signal, said frequency comparator comprising a first "AND" gate to which said frame reset pulses are fed, said first "AND" gate being turned "on" by delayed frame reset pulses and turned "off" by similarly delayed pulses corresponding to the start of the multivibrator cycle which is to be the last in the frame, said first "AND" gate thereby passing said frame pulses when occurring before the start of the last multivibrator pulse which is to be the last in the frame, a second "AND" gate to which is fed the pulses corresponding to the end of the multivibrator cycle which is to be the last in the frame, said second "AND" gate being turned "on" by delayed pulses corresponding to the end of the multivibrator cycle which is to be the last in the frame and "off" by similarly delayed frame reset pulses, said second "AND" gate thereby passing the pulses corresponding to the end of the multivibrator cycle which is to be the last in the frame when occurring before the frame reset pulses, and means for increasing the frequency of said multivibrator in response to a pulse being passed by said first "AND" gate, and decreasing the frequency of said multivibrator in response to a pulse being passed by said second "AND" gate.

2. Means for decommutating a non-return-to-zero multiplexed signal having frequency variations and having a predetermined number of channels per frame, said means comprising a synchronizing generator to which said multiplexed signal is fed; said synchronizing generator having means for deriving frame reset pulses from said multiplexed signal, a multivibrator, a phase control loop cooperating with said multivibrator to lock the multivibrator output pulses in phase with synchronizing pulses derived from said multiplexed signal, and a frequency control loop cooperating with said multivibrator to vary the frequency of said multivibrator to be the same as the frequency of the individual channels of said frame upon variation of the frequency of said multiplexed signal, wherein said phase control loop and said frequency control loop operate simultaneously, a plurality of output demodulation gates to which said multiplexed signal is also fed; and impulse distributor any synthesizer means to which said frame reset pulses and the multivibrator pulses are fed to produce gating pulses for said output demodulation gates to permit decommutation of said multiplexed signal, wherein said frequency control loop includes a first "AND" gate to which said frame reset pulses are fed, said first "AND" gate being turned "on" by delayed frame reset pulses and turned "off" by similarly delayed pulses corresponding to the start of the multivibrator cycle which is to be the last in the frame, said first "AND" gate thereby passing said frame pulses when occurring before the start of the last multivibrator pulse which is to be the last in the frame, a second "AND" gate to which is fed the pulses corresponding to the end of th multivibrator cycle which is to be the last in the frame, said second "AND" gate being turned "on" by delayed pulses corresponding to the end of the multivibrator cycle which is to be the last in the frame and "off" by similarly delayed frame reset pulses, said second "AND" gate thereby passing the pulses corresponding to the end of the multivibrator cycle which is to be the last in the frame when occurring before the frame reset pulses, and means for increasing the frequency of said multivibrator in response to a pulse being passed by said first "AND" gate, and decreasing the frequency of said multivibrator in response to a pulse being passed by said second "AND" gate.

3. A device for demodulating a multiplexed signal having a predetermined number of channels per frame comprising a synchronizing generator, an input distributor and synthesizer and output demodulation gates, said synchronizing generator including a multivibrator the output of which is operatively connected to the input of said impulse distributor and synthesizer, the output of said impulse distributor and synthesizer being connected to said output demodulation gates for opening the demodulation gates, said synchronizing generator including first means providing pulses in response to predetermined amplitude variations between adjacent channels of said multiplexed signal, second means responsive to said pulses and the output of said multivibrator and providing a discrete integrated output signal when said pulses and the output signal of said multivibrator are not in phase, the output signal of said sécond means being operatively connected to said multivibrator, third means responsive to said multiplexed signal and providing an output signal at a predetermined channel of each frame, said synchronizing generator including a frequency comparator responsive to the output signal of said third means and to the output signal of said input distributor and synthesizer corresponding to the same said predetermined channel of each frame and providing an output signal when ther is a change in the repetition rate of the output signal of said third means and the output signal of said impulse distributor and synthesizer, the output signal of said frequency comparator being connected to said multivibrator, said frequency comparator including fourth and fifth means respectively responsive to the leading and trailing edges of the output signal of said input distributor and synthesizer wherein said frequency comparator provides an output signal of one polarity when the output signal of said third means occurs prior to said leading edge and of the opposite polarity when said output signal of said third means occurs after said trailing edge.

References Cited in the file of this patent

UNITED STATES PATENTS 2,794,858 Houghton -------------- June 4, 1957